US012760489B2

(12) United States Patent
Pichler et al.

(10) Patent No.: US 12,760,489 B2
(45) Date of Patent: Oct. 13, 2026

(54) CIVIL ENGINEERING STRUCTURE FOR GUIDING A LINE

(71) Applicant: Alois Pichler, Ybbsitz (AT)

(72) Inventors: Alois Pichler, Ybbsitz (AT); Jan Michael Pichler, Ybbsitz (AT); Lorenz Pichler, Ybbsitz (AT)

(73) Assignee: Alois Pichler, Ybbsitz (AT)

( * ) Notice: Subject to any disclaimer, the term of this patent is extended or adjusted under 35 U.S.C. 154(b) by 55 days.

(21) Appl. No.: 18/685,703

(22) PCT Filed: Aug. 22, 2022

(86) PCT No.: PCT/AT2022/000005
§ 371 (c)(1),
(2) Date: Feb. 22, 2024

(87) PCT Pub. No.: WO2023/023679
PCT Pub. Date: Mar. 2, 2023

(65) Prior Publication Data

US 2024/0360641 A1 Oct. 31, 2024

(30) Foreign Application Priority Data

Aug. 23, 2021 (AT) .................................. A 143/2021
Aug. 26, 2021 (AT) .................................. A 146/2021
Feb. 10, 2022 (AT) .................................... A 42/2022

(51) Int. Cl.
*E02D 27/46* (2006.01)
*H02G 9/02* (2006.01)

(52) U.S. Cl.
CPC ............. *E02D 27/46* (2013.01); *H02G 9/025* (2013.01)

(58) Field of Classification Search
CPC ............ H02G 9/025; E02D 17/10; F16L 1/11
See application file for complete search history.

(56) References Cited

U.S. PATENT DOCUMENTS 2,282,559 A * 5/1942 Byers ..................... H02G 9/025 52/582.1
3,394,509 A * 7/1968 Mckinley ................ E04F 19/08 52/126.2
3,473,339 A 10/1969 Schlafly, Jr.
6,371,619 B1 4/2002 Assinder et al.
8,727,665 B2 5/2014 Pichler et al.
(Continued)

FOREIGN PATENT DOCUMENTS

EP 2972542 1/2016
EP 2868827 B1 5/2017
(Continued)

OTHER PUBLICATIONS

International Search report for PCT/AT2022/000005, prepared by the European Patent Office, mailing date Jan. 24, 2023,6 pages including English Translation.

*Primary Examiner* — Sean D Andrish
(74) *Attorney, Agent, or Firm* — Brooks Kushman P.C.

(57) ABSTRACT

A civil engineering structure for guiding a line in a slot in a surface area outdoors, said slot being formed by a milling or grinding process. A protective cover which consists of sub-pieces connected together in an articulated manner, extends above the line in the slot. The volume region of the slot in which the line is located is unfilled and is protected against expected compressive loads from the top by the sub-pieces.

16 Claims, 7 Drawing Sheets

(56) References Cited

U.S. PATENT DOCUMENTS

Figure 1:
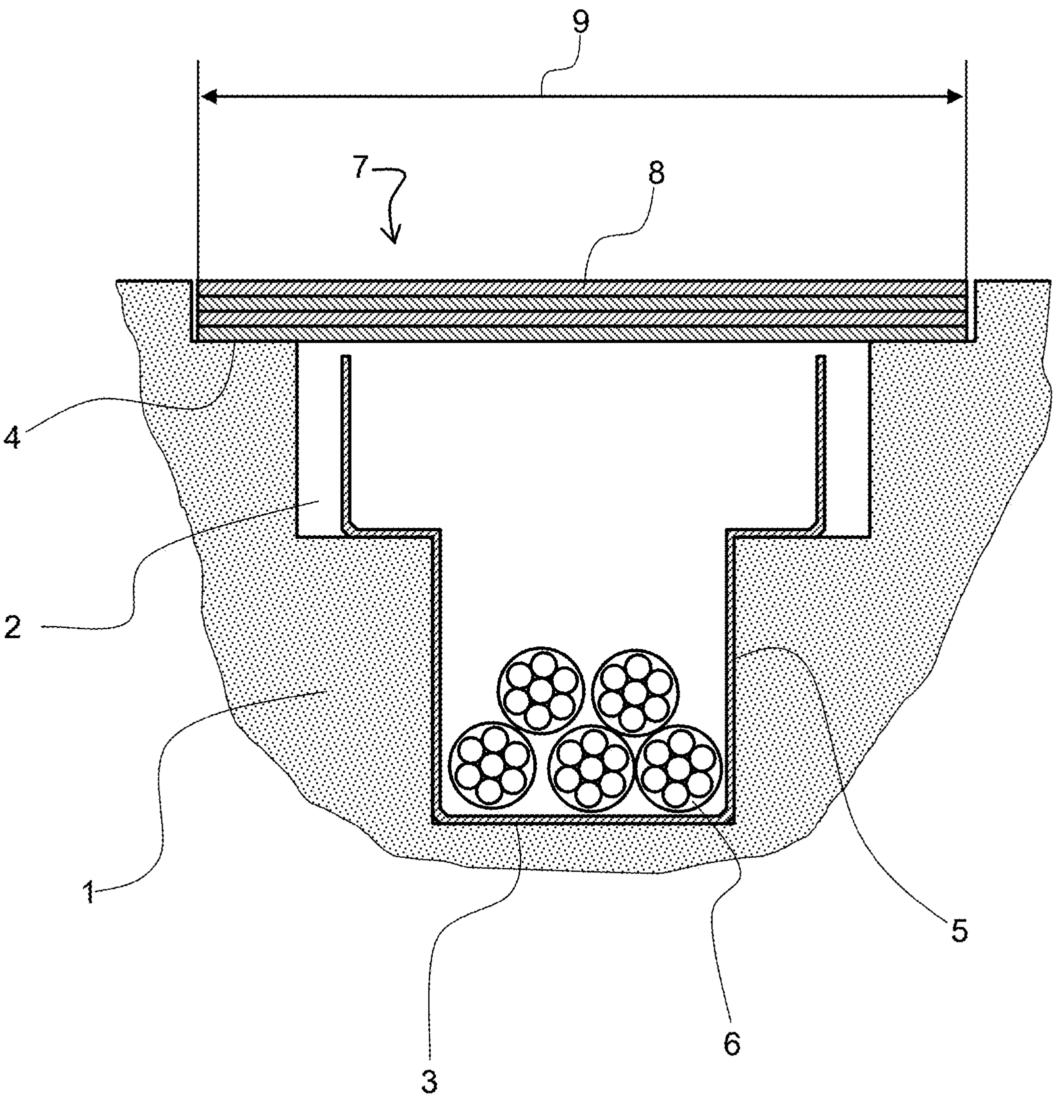

| | | | | |
|---|---|---|---|---|
| 9,062,423 | B2 | 6/2015 | Allouche et al. | |
| 9,531,174 | B2 * | 12/2016 | Elford | E01C 23/025 |
| 2002/0092100 | A1 * | 7/2002 | Byrne | E01C 23/06<br>14/69.5 |
| 2004/0081793 | A1 | 4/2004 | Byrne | |

FOREIGN PATENT DOCUMENTS

| | | | |
|---|---|---|---|
| GB | 1469194 | A | 3/1977 |
| GB | 2321486 | A | 7/1998 |

* cited by examiner

Fig. 2
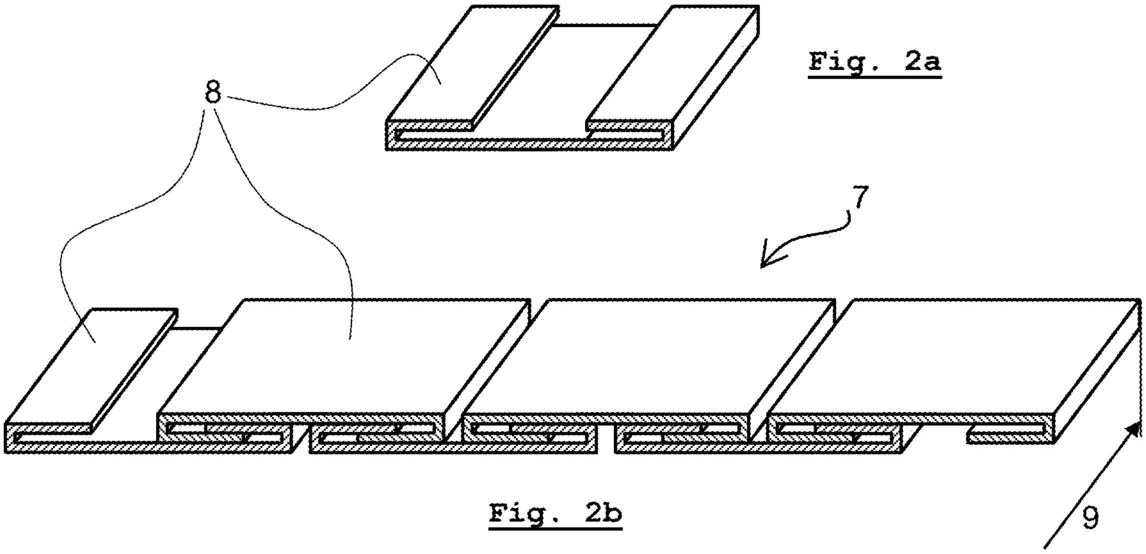
Fig. 2a
Fig. 2b
Fig. 3
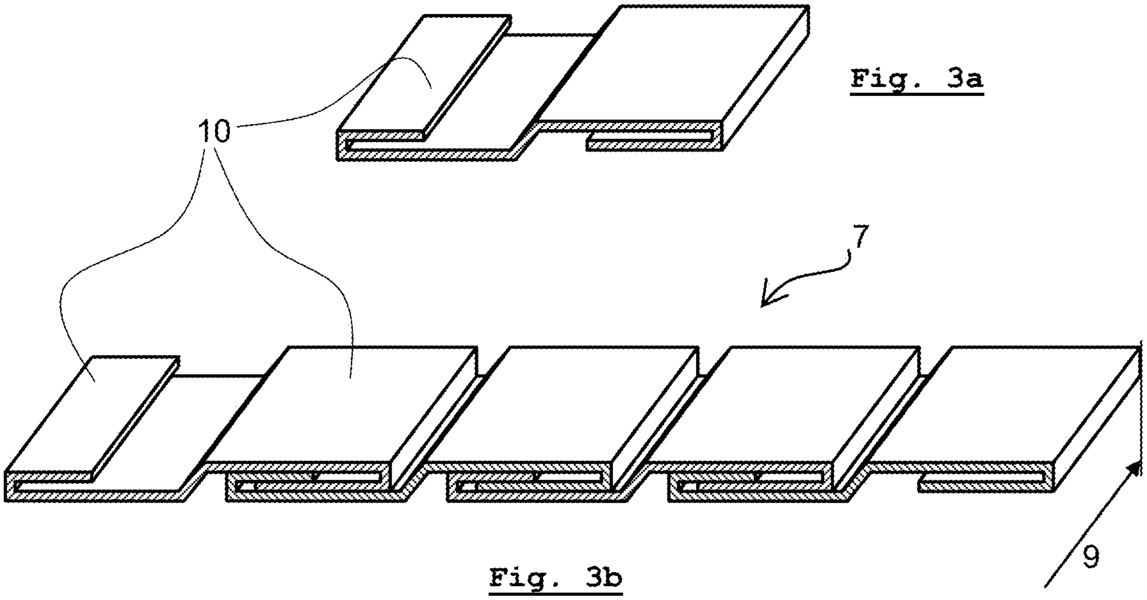
Fig. 3a
Fig. 3b

Fig. 6
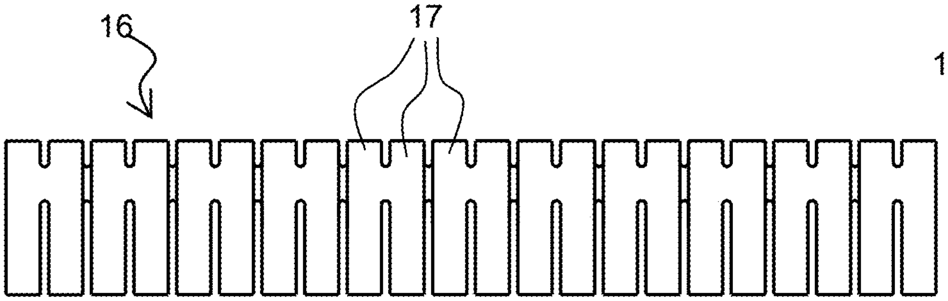
Fig. 6a
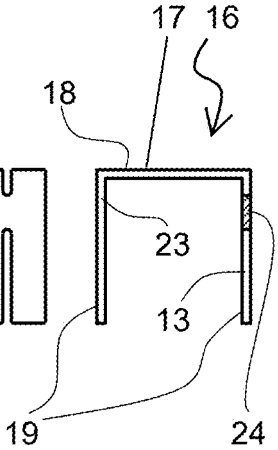
Fig. 6b
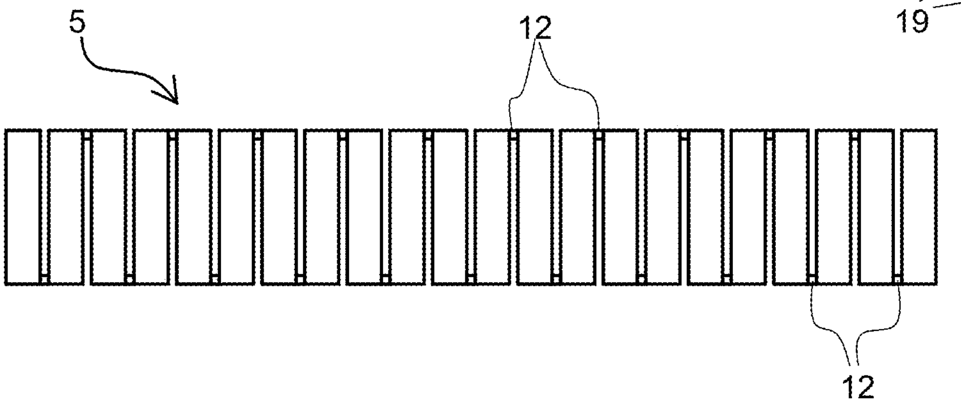
Fig. 6c
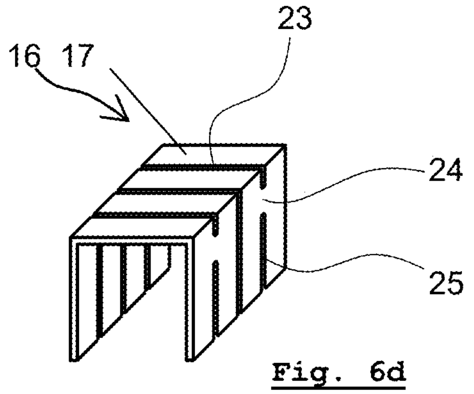
Fig. 6d

CIVIL ENGINEERING STRUCTURE FOR GUIDING A LINE

CROSS-REFERENCE TO RELATED APPLICATION

This application is the U.S. national phase of PCT Application No. PCT/AT2022/000005 filed on Aug. 22, 2022, which claims priority to AT Patent Application No. A 143/2021 filed on Aug. 23, 2021, AT Patent Application No. A 146/2021 filed on Aug. 26, 2021, and AT Patent Application No. A 42/2022 filed on Feb. 10, 2022, the disclosures of which are incorporated in their entirety by reference herein.

The invention relates to a civil engineering structure for conducting a line in a slit trench in an outdoor ground area.

In the field of surfaces sealed with solid material, such as typically roads or sidewalks, to lay lines, such as fiber-optic cables, it is not absolutely necessary to excavate an entire trench, but often only to mill or cut a slit trench in the solid—that is to say non-granular-surface material (asphalt, concrete or paving stones), then to lay the line, and then to close the slit trench up again.

EP 2526450 B1 thus discloses a civil engineering structure for conducting lines in a slit trench made in the ground. The slit trench has a cross-sectional area which narrows downward at least in one step. The lines are laid in the lower, narrower region of the slit trench and surrounded there by granular fill material. The upper, wider cross-sectional surface area of the slit trench is in turn filled with hardenable sealing compound. Because the top part, formed by the hardened sealing compound, of the fill of the slit trench is downwardly in contact with the horizontal step surfaces of the boundary of the slit trench, the lines are not subjected to forces which might press on the sealing compound from above—for example if a heavy vehicle travels over the civil engineering structure.

EP 2 868 827 B1 proposes a further development of the structure according to EP 2526450 B1. According to this further development, the lower region of the slit trench, which is where the lines and granular material are, is upwardly covered not just by hardened sealing compound, but by a combination of a metallic U profile and sealing compound. For this, after lines and granular material have been laid, the U profile, which is interrupted by many slits extending transversely to the profile direction, is introduced into the slit trench with an upwardly open cross-sectional area and then filled from above with sealing compound. This forms a solid composite profile of metal and sealing compound, with the sealing compound also lying closely against the walls of the slit trench.

For example, U.S. Pat. No. 6,371,619 B1 discloses a civil engineering structure for conducting a line, the line being a fiber-optic cable. A slit trench, that is to say an elongate recess with an upwardly open cross-sectional area, is made in the material of the ground—typically a road or a sidewalk—by milling the slit trench. The line-in the specific example, a fiber-optic cable—is laid on the bottom of the slit trench. The cross-sectional area of the slit trench that is not filled by the fiber-optic cable is filled by a hardenable sealing compound. In the typical production of this civil engineering structure, the slit trench is milled, then the fiber-optic cable is laid, and then hold-down devices which keep the fiber-optic cable in position on the bottom of the slit trench are inserted. Lastly, the slit trench is filled with sealing compound in the liquid state, with the sealing compound flush with the surface of the ground, whereupon the sealing compound is allowed to harden.

EP 2972542 B2 also describes a civil engineering structure for conducting fiber-optic cables in a slit trench made in the ground. A hollow profile, which has a closed lateral surface and conducts one or more fiber-optic cables in its cavity in its role as a cable channel, is inserted in the lower region of the slit trench. The cross-sectional surface area of the slit trench that is located outside the hollow profile is filled by hardenable sealing compound.

What the structures described have in common is that they can be implemented readily in a solid, sealed ground outdoors, as is typically formed by an asphalted or paved road, without taking up a lot of space, the lines still being well protected against mechanical loading.

The object on which the invention is based is to improve a civil engineering structure for conducting fiber-optic cables in a slit trench made in the ground in relation to the cited prior art. What the improvements are intended to achieve is that, given otherwise comparable boundary conditions, the work time at the construction site for producing the civil engineering structure is reduced, and subsequent accessibility to the laid lines is improved.

To achieve the object, it is assumed from the known features that the civil engineering structure comprises a slit trench, made by milling or cutting, in an outdoor ground area, in which slit trench a line is laid, wherein a protective cover, which consists of portions each downwardly supported against lateral boundary surfaces of the volume of the slit trench, extends in the slit trench above the line, wherein the portions are arranged in line with one another along the longitudinal direction of the slit trench and articulatedly connected to one another in such a way that they can be pivoted relative to one another about vertical axes.

The proposed improvement according to the invention in this respect is that that volume region of the slit trench where the line is located is left unfilled, and the portions spanning the unfilled volume region are designed fixedly with respect to flexural strength about bending axes parallel to the longitudinal direction of the slit trench such that they upwardly protect the spanned, unfilled volume region against the compressive force loading that is to be expected.

The effect of the improvement according to the invention is that, after lines have been laid in the slit trench, it is not necessary to pour any fill material onto the lines, and that the lines are immediately accessible after subsequent removal of the cover without fill material needing to be removed.

When used on the slit trench in an outdoor ground area, each of the portions of the cover is supported against a respective side of the slit trench and spans the slit trench like a bridge transversely to its longitudinal direction. The portions lie one behind another along the longitudinal direction of the slit trench. Since the portions are articulatedly connected to one another, the cover formed by this in-line arrangement can also extend along curved longitudinal regions of the slit trench without problems, and thus also cover such regions of the slit trench.

According to a particularly preferred design feature of the invention, the cover is a groove profile, which is subdivided into individual portions by slit-like apertures, wherein the longitudinal direction of the slit-like apertures is aligned normal to the profile direction, and the length of the individual slit-like apertures extends over the entire width of the basic face of the U profile and over the entire height of a respective one of the two flank faces. In this way, the cover is easy to handle and, when arranged as intended in the slit trench, can be readily bent about vertical axes, so that it can be adapted very readily to curvatures in the course of the slit trench. For all that, it only loses an insignificant amount of load-bearing capacity against compressive forces acting on it from above.

The invention is illustrated on the basis of somewhat stylized drawings:

FIG. 1: shows a sectional view through a civil engineering structure comprising a slit trench in which lines have been laid, wherein the slit trench is covered by an exemplary cover according to the invention.

FIG. 2: shows a perspective sectional view of a first design variant of the individual modules of the exemplary cover according to the invention from FIG. 1 both in the form of an individual piece (FIG. 2*a*) and a chain (FIG. 2*b*) as intended. The sectional plane is vertical and parallel to the direction of the chain in this figure.

FIG. 3: shows (FIG. 3*a* and FIG. 3*b*), in the same illustration as FIG. 2, a second design variant of the exemplary cover according to the invention from FIG. 1.

Figure 4:
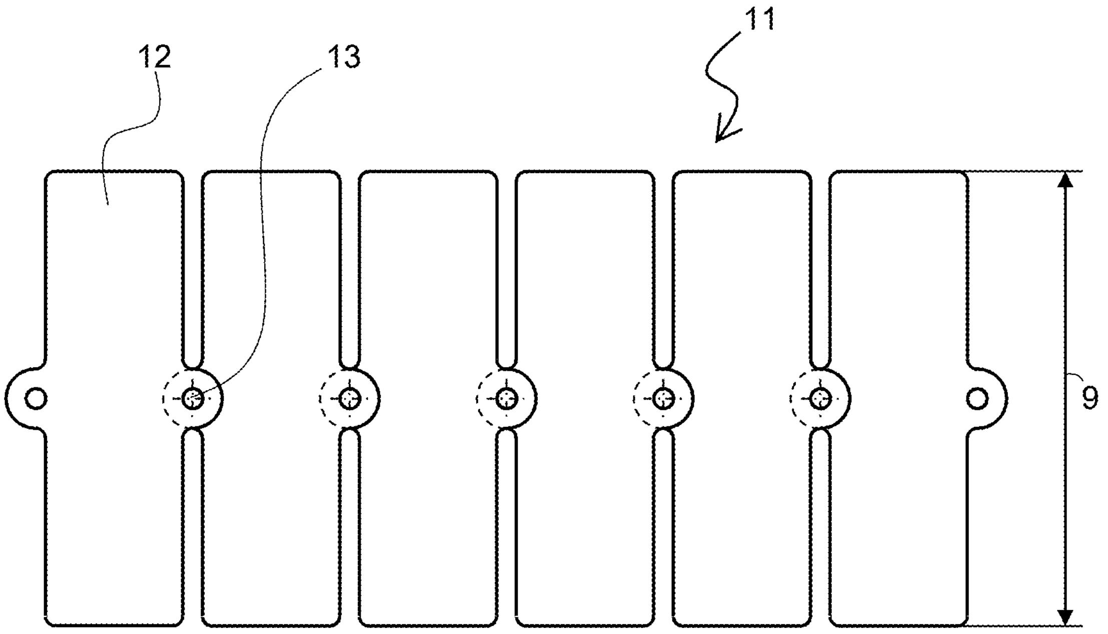

FIG. 4: shows a view from above of a third design variant of individual modules of a cover according to the invention in the chained state.

Figure 5:
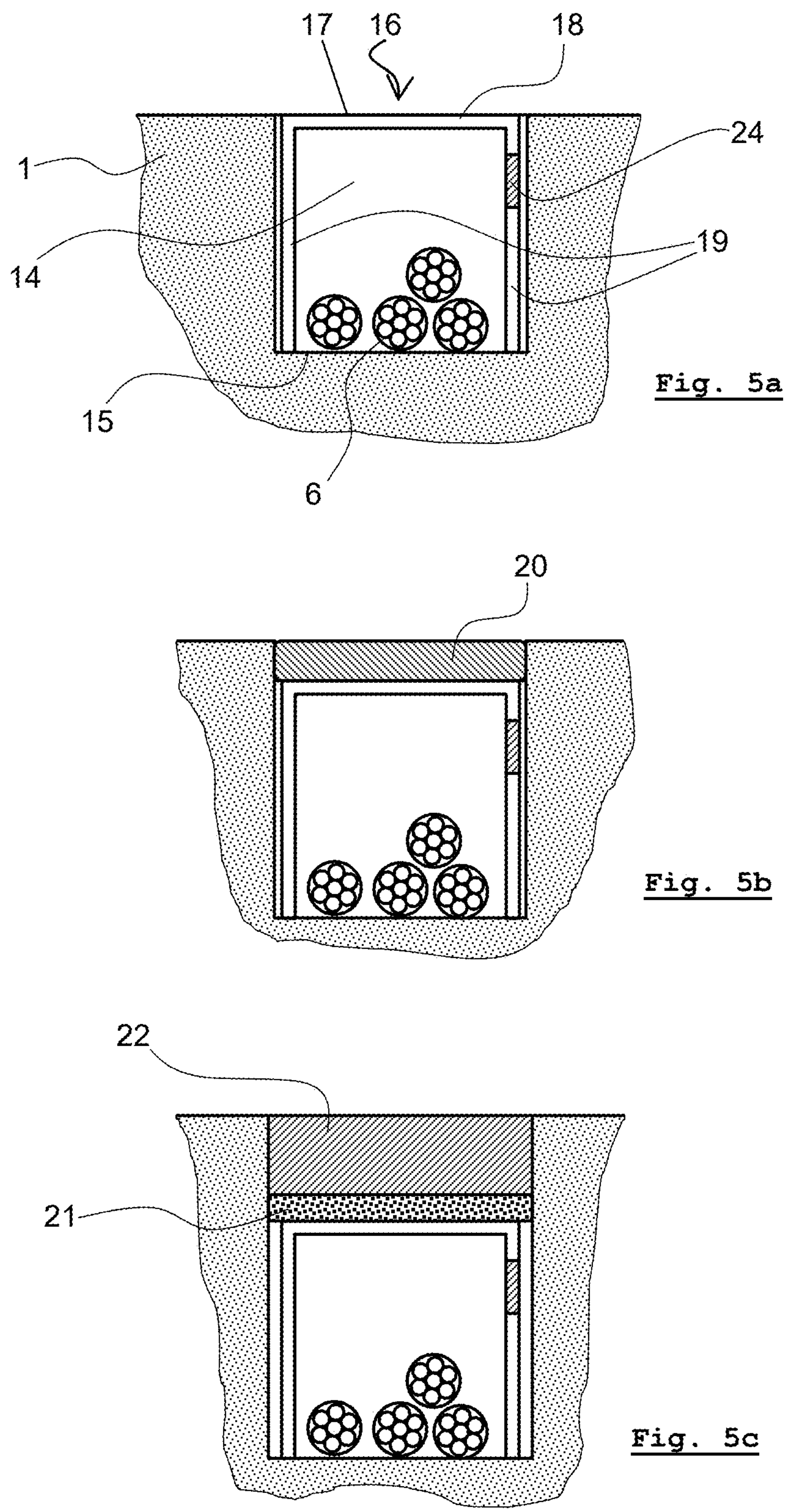

FIG. 5: shows a sectional view, with the sectional plane normal to the direction of the slit trench, through three further exemplary variants of civil engineering structures (FIG. 5*a*, FIG. 5*b*, FIG. 5*c*) according to the invention. The same groove profile is used throughout this figure.

FIG. 6: shows the advantageous groove profile used in the structures according to FIG. 5 in vertical section (FIG. 6*a*), a cross-sectional view (FIG. 6*b*) and outline representation (FIG. 6*c*), and a shortened version thereof in an oblique representation (FIG. 6*d*).

Figure 7:
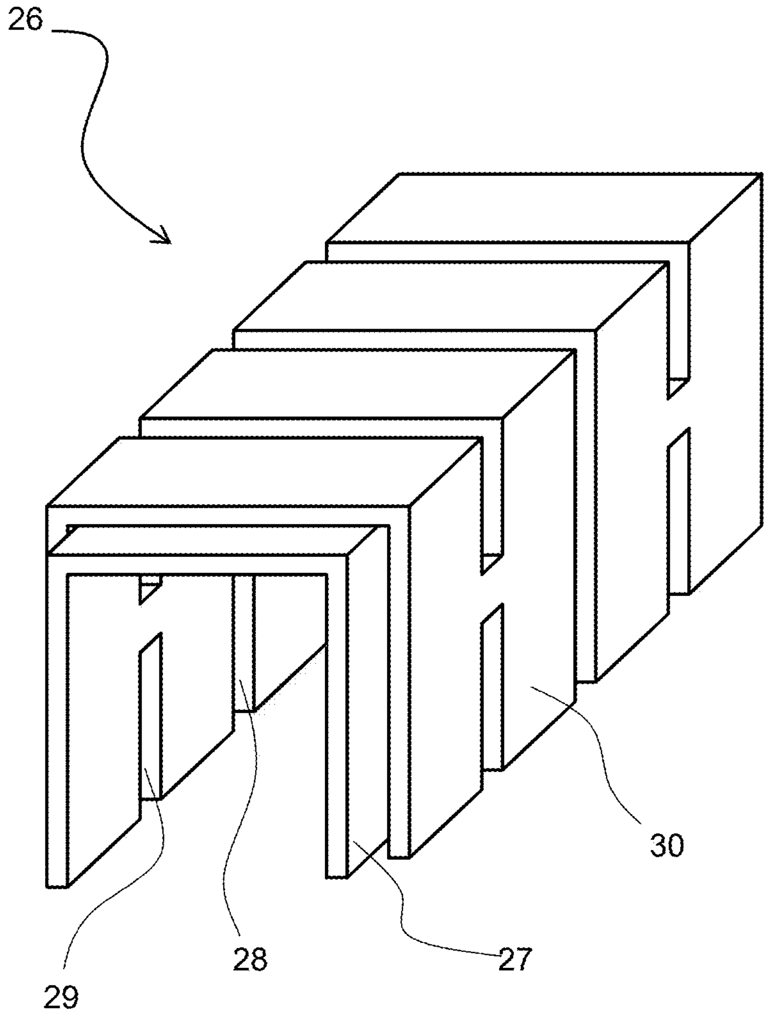

FIG. 7: shows an oblique representation of a segment of another advantageous groove profile.

Figure 8:
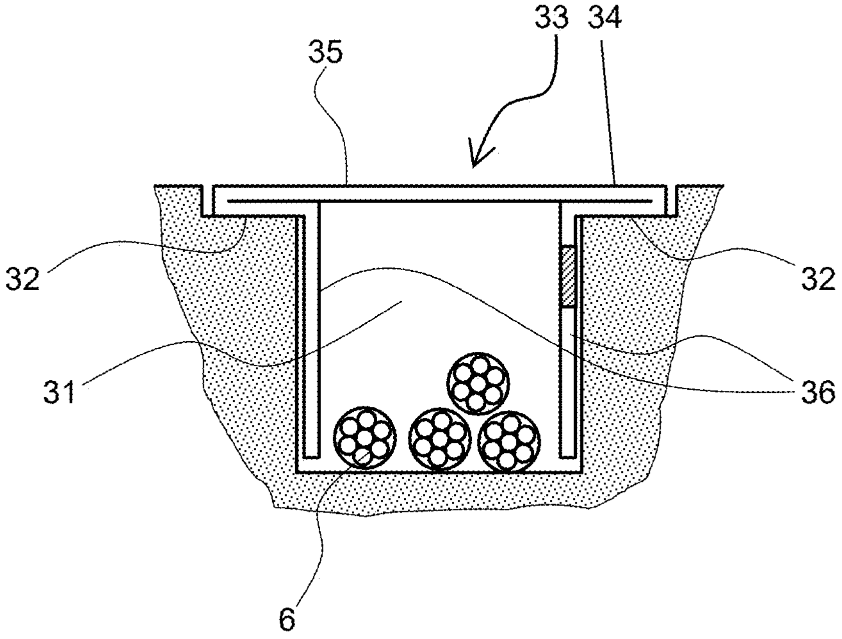

FIG. 8: shows, in the same view as FIG. 1, a fourth exemplary variant of a civil engineering structure according to the invention.

According to FIG. 1, a slit trench 2 having—for example—a cross-sectional area which narrows downward in the manner of a step is milled or cut in a ground 1, which is typically formed by a fixed road or a sidewalk. At boundary surfaces and downwardly, the slit trench 2 illustrated thus has a narrow lower base face 3 and two shoulder faces 4, which are higher up than the base face 3 and at which the width of the slit trench rapidly increases in relation to the width of the base face 3. Another steep, typically perpendicularly aligned boundary face region of the slit trench 2 follows at the external lateral edge of each shoulder face 4.

A hollow profile 5, which extends parallel to the slit trench and can consist of plastic or sheet metal is inserted in the slit trench 2. The lateral surface of the hollow profile 5 is open; in the advantageous case illustrated, the open side is at the top. The lines 6 to be laid are laid in the hollow profile 5.

The slit trench 2 is upwardly closed by a cover 7, which consists of portions 8. The portions 8 span the upper region of the slit trench 2 between its two flanks. In the example illustrated, the portions 8 rest on the shoulder faces 4 of the slit trench 2. It would, however, also be possible for the portions 8 to be supported on other parts, which bear against them from underneath and prevent them from moving downward. As illustrated, the uppermost face of the cover 7 formed by the portions 8 is preferably aligned at least approximately flush with the surface of the ground 1 that surrounds the slit trench 2. The dimension 9 of the cover 7, and thus of the portions 8, measured normal to the longitudinal direction of the slit trench is the same as the width to be covered of the slit trench 2.

The lines 6 to be laid, typically cables, which each comprise a multiplicity of individual fiber-optical lines, are laid in the slit trench 2. In the optional example illustrated, a hollow profile 5, which extends parallel to the slit trench and can consist of plastic or sheet metal, is inserted in the slit trench 2, and the lines 6 are laid in the hollow profile 5.

The portions 8 of the cover 7 are dimensioned fixedly such that they can withstand a motor vehicle traveling over the slit trench 2, without damage. Typically, the portions 8 consist of an iron alloy, that is to say steel or cast iron, to this end. In order to be able to make the portions 8 from a less-strong material, such as aluminum or plastics composites, their vertical dimensions must be made larger.

According to FIG. 2, the portion 8 is a short segment of a very flat C profile (FIG. 2*a*). The two lateral regions of the profile face of the flat C profile are shaped to form a hook. To form the cover 7, a chain is formed by hooking together respectively the right-hand hook of a portion 8 disposed on the left and the right-hand hook of the portion 8 following it on the left (FIG. 2*b*). In this case, the width of the groove between two hook flanks of a first hook is preferably approximately the same as the wall thickness of that profile wall of the hooked further hook that protrudes into the groove, so that in each case either a small clearance fit or a simple interference fit is formed at the individual hooks. The chaining of portions 8 can be curved about axes normal to the flank faces of the individual hooks by overcoming friction, for instance.

According to FIG. 3, the cover 7 is formed from portions 10 (FIG. 3*a*). Here, each portion 10 is a short segment of a very flat S profile. Like in the example according to FIG. 2, the lateral regions of the flat S profiles are also each shaped to form a hook. To form the cover 7, a chain is again formed by hooking together respectively the right-hand hook of a portion 10 disposed on the left and the right-hand hook of the portion 10 following it on the left (FIG. 3*b*). In this case, the width of the groove between two hook flanks of a first hook is preferably again approximately the same as the wall thickness of that profile wall of the adjoining second hook that protrudes into the groove, so that in each case either a small clearance fit or a simple interference fit is formed at the individual hooks. The chaining of portions 10 can be curved about axes normal to the flank faces of the individual hooks by overcoming friction, for instance.

According to FIG. 4, a cover 11, which may have the same function as that of the cover 7 from FIG. 1, is formed in that portions 12 are designed as approximately flat, sheet-like parts which are disposed substantially next to one another with a slight overlap, wherein two mutually overlapping portions 12 in each case are pivotably connected to one another at the longitudinal centers of their mutually facing lateral edges. The connection can be affected, for example, by means of a respective rivet 13, which passes through the two portions 12 in the respective region of overlap. The chain of portions 12 can be curved about pivot axes coinciding with the axes of the rivets 13 by overcoming friction, for instance.

In the exemplary embodiments according to the invention in the drawings FIG. 5 to FIG. 8, the contours of the respective cover have the form of a groove profile, which is put over the lines in the slit trench with a downwardly open cross-sectional area side in front.

The cover can thus discharge compressive forces acting on it from above downward past the lines. It thus acts as an enclosure for the lines, which protects them from mechanical action from above and from the side.

According to FIG. 5, the slit trench 14 is milled or cut in the ground 1 with a typically vertical rectangular cross-sectional area. The lines 6, for example and typically fiber-optic cables, extend along and in the slit trench 14; the lines 6 are downwardly at least indirectly supported by the base face 15 of the slit trench 14.

The required cover 16 for the lines 6 in the slit trench 14 is formed by portions 17. The portions 17 are each a segment of a groove profile, that is to say a profile with a cross-sectional area that encloses the cross-sectional area of a groove. The portions 17 are disposed in the slit trench 14 one behind another in the longitudinal direction of the slit trench, so that they form the cover 16, which extends along and in the slit trench 14. The portions 17 are pushed into the slit trench 14 with a downwardly open cross-sectional area side and put over the lines 6, so that the lines 6 are enclosed at the top by the basic face 18 of the portions 17 and laterally by the flank faces 19 of the portions 17.

At the bottom, the portions 17 rest on the base face 15 of the slit trench t 14 and are supported thereby. As intended, the portions 17 have a fixed design such that they can withstand the maximum compressive forces from above that are to be expected. Typically, they are those forces that arise when a road vehicle travels on the surface of the ground 1 and in the process travels over the slit trench 14.

In order that the portions 17 do not sink in the ground 1 in the event of a compressive force from above, it is necessary for the material adjoining the base face 15 of the slit trench 14 at the bottom to have sufficient strength. If this material is the usual material for road coverings, that is to say asphalt, concrete or stone, it certainly does have sufficient strength. This is always the case when the slit trench 14 is milled or cut to a shallower depth than the layer thickness of the upper, strong material of the ground 1 when the slit trench is being milled or cut.

If the ground material at the base face 15 is expected to be less strong, it is necessary to form a separate strong layer (not illustrated) as the bottom of the slit trench 14 in order to be able to apply the structure according to the invention.

In the example according to the top part of the image in FIG. 5 (FIG. 5*a*), the cover 16 formed by the portions 17 is approximately flush with the surface of the ground 1, and the upper basic faces 18 of the portions 17 constitute the visible cover of the slit-trench 14. This design variant is very easy and inexpensive in terms of manufacture and maintenance work. Concerns can occasionally arise in terms of the appearance and robustness of the protection of the lines 6 primarily against vandalism.

In the example according to the central part of the image in FIG. 5 (FIG. 5*b*), the cover 16 is covered at the top by a covering layer 20, the upper face of which again is approximately flush with the surface of the ground 1. The covering layer of the covering part may, for example, be formed by parts made of thermoplastic material or of metallic parts, or by a coarse granular material. A more pleasant appearance and also more robust protection of the lines 6 can be achieved in comparison with the design corresponding to the top part of the image, without excessively increasing the complexity of mounting and maintenance.

In the example according to the bottom part of the image in FIG. 5 (FIG. 5*c*), the cover 16 is covered at the top first by a sealing strip 21 and then by a hardened sealing compound 22, wherein the top surface of the hardened sealing compound 22 terminates flush with the surface of the ground 1. This structure makes it possible to form a cover for the slit trench 14 which merges largely seamlessly into the surface of the ground 1. However, the work complexity in the event of maintenance on the slit trench 14 is greater than in the previous versions.

FIG. 6 shows multiple somewhat stylized views (FIGS. 6*a*-6*d*) of ways in which the portions 17 interact to form the cover 16 from FIG. 5.

On the one hand, for the intended use case, each portion 17 must be stable with respect to compressive forces acting between the outer side of the basic face 18 and the end faces, spaced apart therefrom, of the flank faces 19 and, on the other hand, the cover 16 in the form of a chaining of the portions 17 should be readily flexible about axes normal to the basic faces 18. This flexibility is necessary in order that the cover 16 can easily be laid even in curved longitudinal regions of the slit-trench 14.

The cover 16 is typically made from a sheet steel strip, which was rolled into the form of a U profile. In order to achieve the desired deformability, this U profile has regularly recurring slit-like apertures 23, of which the longitudinal direction is aligned normal to the profile direction of the U profile and the length extends over the entire width of the basic face 18 and over the entire height of respectively just one of the two flank faces 19 with respect to the U profile. The respective slit-like aperture 23 ends in a material partition 24 at the respective other one of the two flank faces 19.

The material partition 24 preferably—as illustrated—does not extend as far as the bottom edge of the respective flank face 19. Instead, an additional slit-like aperture 25 extends from said bottom edge of this flank face 19 to the opposite side of the material partition 24 to the first slit-like aperture 23.

Such a slit-like aperture 23 which completely divides the right-hand flank face follows a slit-like aperture 23 which completely divides the left-hand flank face, along the longitudinal direction of the cover 16. In this way it is possible to achieve, in the best possible way, a largely uniform and gentle flexibility of the cover 16.

The slit-like apertures 23 subdivide the cover 16 into the individual portions 17. Adjacent portions 17 are connected by a respective one of the material partitions 24. Since the material partitions 24 have a small cross-sectional area, they are readily flexible, whereby the portions 17 can be pivoted with respect to one another by overcoming some force of resistance against deformation of the material partitions 24.

The lower end of the material partition 24 is preferably above the halfway point of the height of the respective flank face 19, and the upper end of the material partition 24 is preferably below the corner region of the flank face 19 with the basic face 6. This results in the best ease of handling of the cover 16.

FIG. 7 shows, by way of example, a further exemplary cover 26, which can be regarded as a combination of two covers in the manner of the cover 16 from FIG. 6. In this case, an internal groove profile 27, which, as described with reference to FIG. 6, has slit-like apertures 28, 29 to increase its flexibility, is partially enclosed and upwardly covered by a further, external groove profile 30, which likewise comprises a downwardly open cross-sectional area side. Here, the covering external groove profile 30, in the same way as the covered groove profile 27, has slit-like apertures so that it is flexible. The apertures in the covering groove profile 30 are offset with respect to the apertures 28, 29 in the covered groove profile 27 in the profile di-rection. This has the effect that the volume region between the flanks of the cover 26 is upwardly covered without gaps.

For example, the covering groove profile 30 together with the covered groove profile 27 can be made from a common sheet-metal strip by stamping and roll forming, and the two groove profiles 30, 27 remain monolithically connected in the process. It is, however, also possible to produce separate groove profiles 30, 26 and put them on top of one another and connect them separately at individual points.

FIG. 8 again shows a civil engineering structure according to the invention, in which the slit trench 31 in the ground 1 has a cross-sectional area with a width which abruptly decreases downwardly at shoulder faces 32.

The associated cover 33 again consists of portions 34, which have the form of short U profile pieces, and thus have a basic face 35 and two flank faces 36, wherein the basic face 35 is at the top. In this instance, the basic face 35 is widened with respect to the distance between the outer faces of the flank faces 36, so that it laterally projects beyond the flank faces 36. The basic face 35 of the respective portion 34 of the cover 33 rests with the projecting faces on the shoulder faces 32 of the slit-trench 31. In this structure, loading by compressive forces on the cover 33 from above is not discharged directly to the base face of the slit trench 31, but to the shoulder faces 32. Given otherwise comparable boundary conditions, the civil engineering structure can thus withstand greater compressive forces from above than that according to the structural variants from FIG. 5.

Like the covers according to the embodiments in FIG. 5, FIG. 6, and FIG. 7, the cover 33 may also be a groove profile which has slit-like apertures and material partitions constituting the separation, or the flexible connections, between the portions 34 of the cover 33.

According to a variant of the invention which is not illustrated, the slit trench in the ground 1 may have shoulder faces, although the cover according to the invention can still rest on the base face of the slit trench, and an additional cover may rest on the shoulder faces of the slit trench above the cover according to the invention.

According to an addition to the invention which is not illustrated, the portions of the cover that is applied according to the invention have projections which project laterally from the other profile face of the cover and, in the mounted state, bear against a respective flank face of the slit trench in the ground under pressure. This easily brings about a sort of anchoring of the cover in the slit trench.

According to another addition to the invention which is not illustrated, the respective surface at the very top of the cover applied according to the invention is designed such that it has better slip resistance than would otherwise be the case with a flat sheet-metal surface. This slip-resistant design can be brought about by a separate coating or by embossed or stamped portions in the uppermost sheet-metal face. Such embossed portions are known in the context of tread plates; they have the effect that the surface is given sharp-edged roughnesses, which make it slip-resistant.

The invention claimed is:

1. A civil engineering structure for conducting a line in a slit trench, made by milling or cutting, in an outdoor ground area, comprising a protective cover, which consists of portions each downwardly supported against lateral boundary surfaces of a volume of the slit trench, extends in the slit trench above the line, wherein the portions are arranged in line with one another along a longitudinal direction of the slit trench and articulatedly connected to one another whereby the portions are pivotal relative to one another about vertical axes, wherein a volume region of the slit trench where the line is located is unfilled, and in that the portions are designed fixedly with respect to flexural strength about bending axes parallel to the longitudinal direction of the slit trench such that the portions upwardly protect the spanned, unfilled volume region against a compressive force loading that is to be expected;

wherein the cover has contours of a groove profile, which is put over the line in the slit trench with a downwardly open cross-sectional area side in front;

wherein the portions of the cover have a form of a U profile piece, and in that the portions are arranged one behind another in line in a profile direction of the portions, and between adjacent portions there is a respective slit-like aperture, of which the longitudinal direction is aligned normal to the profile direction and a length extends over an entire width of a basic face and over an entire height of respectively just one of two flank faces of the U profile piece; and wherein the protective cover further comprises a combination of two protective covers with a first protective cover with an external groove profile on top of a second protective cover with an internal groove profile.

2. The civil engineering structure as claimed in claim 1, wherein a first dimension of the portions is substantially the same as a width to be covered of the slit trench.

3. The civil engineering structure as claimed in claim 1, wherein lateral flank faces of the portions of the two protective covers extend into a height region where the line is located.

4. The civil engineering structure as claimed in claim 1, wherein a lower region of the two protective covers rests on a base face of the slit trench.

5. The civil engineering structure as claimed in claim 1, wherein each of the two protective covers has an upper basic face and two flank faces, wherein the upper basic face projects on either side beyond strips occupied by the flank faces and space between the flank faces, and rests with two projecting regions against a respective shoulder face of the slit trench.

6. The civil engineering structure as claimed in claim 1, wherein each of the two protective covers, has apertures on an upward face thereof, wherein one of the apertures is covered by a further part.

7. The civil engineering structure as claimed in claim 6, wherein the further part is a portion of a groove profile.

8. The civil engineering structure as claimed in claim 1, wherein the line is a fiber-optic cable.

9. The civil engineering structure as claimed in claim 1, wherein the first protective cover with the external groove profile, is sized to be flush with a ground surface when installed in the slit trench.

10. The civil engineering structure as claimed in claim 1, further comprising a covering layer to be disposed over the first protective cover with the external groove profile, during installation in the slit trench.

11. The civil engineering structure as claimed in claim 10, wherein the covering layer is formed from thermoplastic material, metallic parts, or by a coarse granular material.

12. The civil engineering structure as claimed in claim 1, further comprising:

a sealing strip to be disposed over the first protective cover with the external groove profile, during installation in the slit trench; and a hardened sealing compound to be disposed over the sealing strip during installation in the slit trench.

13. A civil engineering structure for conducting a line in a slit trench, made by milling or cutting, in an outdoor ground area, comprising a protective cover, which consists of portions each downwardly supported against lateral boundary surfaces of a volume of the slit trench, extends in the slit trench above the line, wherein the portions are arranged in line with one another along a longitudinal direction of the slit trench and articulatedly connected to one another whereby the portions are pivotal relative to one another about vertical axes, wherein a volume region of the slit trench where the line is located is unfilled, and in that the portions are designed fixedly with respect to flexural strength about bending axes parallel to the longitudinal direction of the slit trench such that the portions upwardly protect the spanned, unfilled volume region against a compressive force loading that is to be expected;

wherein the cover has contours of a groove profile, which is put over the line in the slit trench with a downwardly open cross-sectional area side in front;

wherein the portions of the cover have a form of a U profile piece, and in that the portions are arranged one behind another in line in a profile direction of the portions, and between adjacent portions there is a respective slit-like aperture, of which the longitudinal direction is aligned normal to the profile direction and a length extends over an entire width of a basic face and over an entire height of respectively just one of two flank faces of the U profile piece; and wherein the cover is sized to be flush with a ground surface when installed in the slit trench.

14. A civil engineering structure for conducting a line in a slit trench, made by milling or cutting, in an outdoor ground area, comprising a protective cover, which consists of portions each downwardly supported against lateral boundary surfaces of a volume of the slit trench, extends in the slit trench above the line, wherein the portions are arranged in line with one another along a longitudinal direction of the slit trench and articulatedly connected to one another whereby the portions are pivotal relative to one another about vertical axes, wherein a volume region of the slit trench where the line is located is unfilled, and in that the portions are designed fixedly with respect to flexural strength about bending axes parallel to the longitudinal direction of the slit trench such that the portions upwardly protect the spanned, unfilled volume region against a compressive force loading that is to be expected;

wherein the cover has contours of a groove profile, which is put over the line in the slit trench with a downwardly open cross-sectional area side in front;

wherein the portions of the cover have a form of a U profile piece, and in that the portions are arranged one behind another in line in a profile direction of the portions, and between adjacent portions there is a respective slit-like aperture, of which the longitudinal direction is aligned normal to the profile direction and a length extends over an entire width of a basic face and over an entire height of respectively just one of two flank faces of the U profile piece; and further comprising a covering layer to be disposed over the cover during installation in the slit trench.

15. The civil engineering structure as claimed in claim 14, wherein the covering layer is formed from thermoplastic material, metallic parts, or by a coarse granular material.

16. A civil engineering structure for conducting a line in a slit trench, made by milling or cutting, in an outdoor ground area, comprising a protective cover, which consists of portions each downwardly supported against lateral boundary surfaces of a volume of the slit trench, extends in the slit trench above the line, wherein the portions are arranged in line with one another along a longitudinal direction of the slit trench and articulatedly connected to one another whereby the portions are pivotal relative to one another about vertical axes, wherein a volume region of the slit trench where the line is located is unfilled, and in that the portions are designed fixedly with respect to flexural strength about bending axes parallel to the longitudinal direction of the slit trench such that the portions upwardly protect the spanned, unfilled volume region against a compressive force loading that is to be expected;

wherein the cover has contours of a groove profile, which is put over the line in the slit trench with a downwardly open cross-sectional area side in front;

wherein the portions of the cover have a form of a U profile piece, and in that the portions are arranged one behind another in line in a profile direction of the portions, and between adjacent portions there is a respective slit-like aperture, of which the longitudinal direction is aligned normal to the profile direction and a length extends over an entire width of a basic face and over an entire height of respectively just one of two flank faces of the U profile piece;

wherein the cover is sized to be flush with a ground surface when installed in the slit trench; and further comprising:

a sealing strip to be disposed over the cover during installation in the slit trench, and a hardened sealing compound to be disposed over the sealing strip during installation in the slit trench.

* * * * *